United States Patent
Aarstein et al.

(10) Patent No.: US 8,280,696 B1
(45) Date of Patent: Oct. 2, 2012

(54) METHOD FOR COMPUTER AIDED DESIGN OF CONDUIT

(75) Inventors: Jon Andreas Aarstein, Oslo (NO); Knut Magnus Ekeberg, Oslo (NO)

(73) Assignee: Ultra Deep, LLC, Houston, TX (US)

( * ) Notice: Subject to any disclaimer, the term of this patent is extended or adjusted under 35 U.S.C. 154(b) by 0 days.

(21) Appl. No.: 12/034,502

(22) Filed: Feb. 20, 2008

(51) Int. Cl.
*G06F 17/50* (2006.01)
(52) U.S. Cl. .............. 703/1; 703/13; 700/98; 700/107
(58) Field of Classification Search .............. 703/1, 6, 703/13; 715/769; 345/619
See application file for complete search history.

(56) References Cited

U.S. PATENT DOCUMENTS

| | | | | |
|---|---|---|---|---|
| 4,862,376 | A * | 8/1989 | Ferriter et al. | 700/107 |
| 5,187,788 | A * | 2/1993 | Marmelstein | 717/109 |
| 5,515,524 | A * | 5/1996 | Lynch et al. | 703/13 |
| 5,740,341 | A * | 4/1998 | Oota et al. | 345/420 |
| 5,917,730 | A * | 6/1999 | Rittie et al. | 703/6 |
| 5,987,458 | A * | 11/1999 | Anderson et al. | 707/6 |
| 6,272,387 | B1 * | 8/2001 | Yoon | 700/83 |
| 6,493,679 | B1 * | 12/2002 | Rappaport et al. | 705/29 |
| 6,839,642 | B2 * | 1/2005 | Kawakita et al. | 702/42 |
| 7,103,434 | B2 * | 9/2006 | Chernyak et al. | 700/98 |
| 7,107,197 | B1 * | 9/2006 | Shropshire | 703/13 |
| 7,437,688 | B2 * | 10/2008 | Graham et al. | 716/119 |
| 7,558,705 | B1 * | 7/2009 | Hughes et al. | 703/1 |

OTHER PUBLICATIONS

Huang Zhizhang et al., "Computer-Aided Engineering for CANDU Projects", 2005, retrieved from http://canteach.candu.org/library/20054410.pdf on Dec. 4, 2008.*
MIP's CoCreate Blog, "SpaceCable 2006 is released—Introducing the next generation of harness design and manufacturing", retrieved from http://my.opera.com/cocreate/blog/show.dml/236850 on Dec. 3, 2008.*
Dr. R.H. Knapp et al., "Computer-aided Design of Cables for Optimal Performance," 2005, Sea Technology, pp. 1-5.*
Paul G. Cardinal, "An Expert System for Computer Generation of Cable, Conduit, and Tray Schedules for INdustrial Power and Control Systems," 1995, IEEE trans. on Industry Applications, vol. 31, No. 1, pp. 222-228.*
D. Patil et al., "Interactive Graphical Database for Undersea Cable Design", 1993, IEEE, pp. 1-6.*
John F. Bash, ed.; "Handbook of Oceanographic Winch, Wire, and Cable Technology"; 2001; National Science Foundation; Table of Contents, Introduction, and Chapte 2; 142 total pages.*
John M. Vlissides et al., "Unidraw: A Framework for Building Domain-Specific Graphical Editors", 1990, ACM, pp. 237-268.*

(Continued)

*Primary Examiner* — Mary C Jacob
(74) *Attorney, Agent, or Firm* — Buskop Law Group, PC; Wendy Buskop

(57) ABSTRACT

A method for computer aided design of conduit comprising: creating a library of specification information and a library of drawing characteristics related to a plurality of element types and bundles. An element type is selected, and an identification key is calculated for the selected element type, forming a graphics object. The selecting of element types and the calculating of identification keys is repeated, forming an updated graphics object. Specification information and drawing characteristics are retrieved from the libraries and stored in association with each selected element type. At least two element types are selected to form a bundle. An identification bundle key is calculated for the bundle. Selection of element types to form additional bundles is repeated, calculating identification bundle keys or each additional bundle, forming an updated bundle graphics object. Specification information and drawing characteristics for the bundles are retrieved and stored in association with the bundles.

18 Claims, 7 Drawing Sheets

OTHER PUBLICATIONS

J.C. Browne et al., "Graphical Programming for simulation of computer systems", 1985, Proceedings of the 18th annual symposium on Simulation, pp. 109-126.*

Deborah Hix et al., "Developing User Interfaces—Ensuring Usability Through Product & Process", 1993, pp. 57-92.*

Curl, Gilbert, "Mechanical Design Automation in IBM Poughkeepsie", 18th Design Automation Conference, paper 10.2, 1981.*

Simmons et al, "The Application of Virtual Reality to Tasks in Manufacturing and Assembly Engineering", KSME International Journal, vol. 12, No. 1, pp. 1-11, 1998.*

Holbrook Enterprises, WireCAD, Version 3.2, User Manual, 2000-2004.*

Park et al, "Computational Support for Concurrent Engineering of Cable Harnesses", CDR Technical Report No. 19920219, Feb. 15, 1992.*

* cited by examiner

METHOD FOR COMPUTER AIDED DESIGN OF CONDUIT

FIELD

The present embodiments relate to a method for computer aided design of conduit.

BACKGROUND

A need exists for a method that enables custom design of umbilicals, electrical signal, and power cables, by individuals that lack specialized computer assisted drawing skills, drafting skills, or advanced engineering or mathematical abilities.

A further need exists for a method that enables production and manipulation of electronic drawings for umbilicals that depict all parts, angles, and vectors of the umbilicals, efficiently, enabling nearly instantaneous user operation.

A need also exists for a method that enables design of umbilicals that is extremely accurate, enabling better and faster quality control than conventional methods.

The present embodiments meet these needs.

BRIEF DESCRIPTION OF THE DRAWINGS

The detailed description will be better understood in conjunction with the accompanying drawings as follows.

Figure 1:
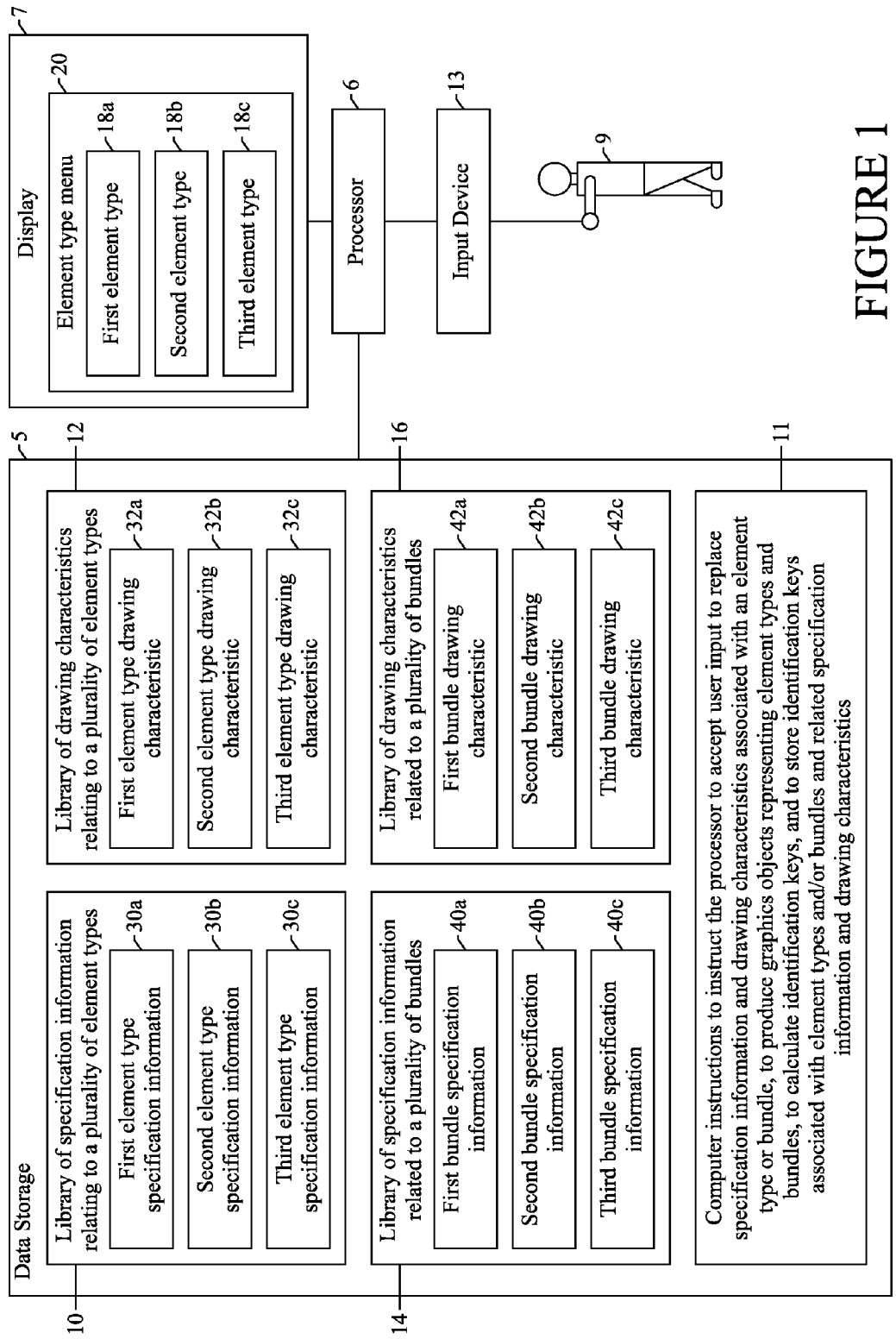
FIG. 1 depicts a diagram of an embodiment of a system useable with the present method.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a method for computer aided design of conduits. A conduit can include an umbilical, a tubular polymer casing, a tubular laminate casing such as a polymer over metal, and other similar conduits, with or without coatings, and optionally containing additional tubes or metal with cathodic protection. An example of such a conduit can be an umbilical for the Helix-Phoenix project, made by Parker Cabett of Houston, Tex.

Conduits can contain electrical cables, such as copper electrical wiring, signal cables, such as those made by Geospace of the United States, NSW of Germany, or Nexans Norway of Norway, or single core, two-core, three-core, or multiple-core cables, such as those made by the same manufacturers. Conduits can also contain gas carrying tubes, including natural gas carrying tubes, such as six-inch flexible tubes, fluid carrying tubes, such as ½ inch superduplex carrying a hydraulic fluid such as HW540, annulus tubes, such as ½ inch duplex carrying fluids that leak from a riser or from casing surrounding a well. Conduits can further include polymeric tubes, such as nylon tubes carrying fluids or gasses or gaseous vapors which leak from a well, flexible conduit, or graphite composite tubes carrying hydrocarbon fluids. Conduits can also include communication media, such as signal, coaxial, telephone, fiber optic cable, or combinations thereof, such as those made by Sumitomo or Corning.

The present method provides the advantage of enabling custom design of conduits, which can include any number of elements, bundles of elements, super bundles, aggregations of bundles and super bundles with or without additional elements, and further recursive aggregations.

The present method is easily used to design conduits containing non-standard umbilical and/or conduit element types. The present method further enables non-standard umbilical and/or conduit element types to be utilized and designed repeatably.

For example, an umbilical containing two electrical quads, eight ½-inch tubes, and one 1-inch tube can be quickly depicted using the present method. Specification information and graphics objects for each element, bundle, super bundle, or aggregations thereof is readily retrievable using the present method.

Technical and/or cost calculations relating to bundles and larger aggregations can be performed practically instantaneously because the specification information is electronically linked to the graphics objects. This is a significant time-saving and money-saving benefit for umbilical designers.

The present method involves the use of at least two and up to three libraries for design of a specific umbilical. By linking to these libraries and using a graphic object formation methodology, a designer can specify a specific length for a uniquely designed umbilical and obtain quickly a list of components, raw materials, and manufacturing costs, to determine overall cost for manufacture of the umbilical or conduit, using only ten percent or less of the time currently required using conventional hand-drawn techniques for umbilicals and other conduits. The present method uniquely enables a list of raw materials, parts, and other costs for a conduit to be generated simultaneously when designing an umbilical or similar conduit.

The method provides tremendous versatility in the design process by offering a customer more than one option with more than one set of costs for each umbilical design, practically simultaneously. The method enables a customer to evaluate several designs and thereby choose the most cost-optimizing option in the manufacturing process, and thereby be more competitive in the industry.

Further, the present method enables default specification information for a conduit, bundle, or larger aggregation, to be simply and efficiently modified and stored in association with their related graphics objects, through use of identification keys that are unique to each stored element type, bundle, or larger aggregation.

The present method can thereby be used to design unique custom bundles that can be saved for easy and rapid retrieval. The modification of specification information enables a user to see the impact of a change of specification information in multiple mechanical characteristics, costs, and other areas. For example, a user can change the material of a fluid carrying tube, and view updated mechanical and cost-related characteristics in response to the change.

The present method is simple to operate and can be performed by individuals who lack computer assisted drawing skills, engineering, calculus, or higher math skills, or drafting skills. No draftsman or manual drafting is required to design conduits using the present method. No manual engineering or mathematical calculations are required to provide mechanical specifications, as the present method incorporates use of software that performs calculations to provide mechanical properties of a design. The present method thereby conserves time and costs related to labor, as well as time and costs related to the drafting process.

The present method provides the benefit of increased efficiency over conventional methods by providing rapid electronic drawing and design of umbilicals and other conduits, which are typically drawn by hand. Manipulation of drawings can be performed simply and quickly, by users with little specialized training, further enhancing the efficiency of the present method.

Through use of menu-based software which provides mechanical properties for conduit designs, the present method enables very rapid, nearly instantaneous user operation. The software also displays integrated calculations and drawings on the same screen as elements related to the calculations, further enhancing the efficiency and ease of use of the present method.

The present method enables production of a full, detailed representation of each part of a conduit, with calculations that account for three dimensions, showing all angles, vectors, and parts of a conduit, which enables more accurate raw material calculation for creation of conduits than conventional methods. This benefit of the present method not only conserves time and costs, but also reduces the consumption and waste of materials and resources.

The present method enables engineers, designers, and other users to create drawings in the same manner in which a conduit is created—from the center to the outside. This benefit enhances the efficiency and accuracy of the design process by allowing a conduit to be depicted in the same manner and order that an umbilical engineer or designer would conceptualize the conduit.

Through the production of electronic drawings, the present method reduces the errors that can occur in the manual drafting process, enabling better and faster quality control than conventional methods. The present method can produce multiple umbilicals and other conduits in a single day, with a minimum of error, and a minimum of wasted time and materials. Conventional umbilical design methods are typically limited to design of a single umbilical in a day, while the present method can produce a single umbilical in as little as ten minutes.

The present method incorporates use of software that can interface with other software packages to form modules and larger integrated packages having multiple features. The software can act as an input file for other engineering and design software programs, such as Abaqus™, owned by Simulia, that can incorporate the calculations and features of the conduit designed using the present method.

Additionally, the software can be secured, such as by using encryption or similar measures, to prevent terrorism, industrial espionage, and similar difficulties.

The present method includes creating a library of specification information related to each of a plurality of element types and each of a plurality of bundles. The library of specification information can be coded as a table within a software tool useable to perform the present method, avoiding the need for use of a separate database or application and allowing faster retrieval of the specification information than other methods.

In an embodiment, the library of specification information could be an updatable list, database, array, or similar compilation of information.

For example, when an element type is depicted using the present method, it is originally assigned default specification information from the library of specification information. If modified specification information is input by a user, the element type can be stored in association with the modified specification information, and the element type with modified specification information can be retrieved for future use.

The term "element type" can refer to any tube, sheath, tape, wire, strand, armor, or similar element able to be used in a conduit. Element types can include a metal tube having an inner diameter raging from 0.05 inches to 42 inches, an extruded polymer sheath applied around tubes or bundles of element types, a reinforced nylon tape with or without an adhesive, a flat armor wire, such as wire made by Drahtwerk of Germany, or a round armor wire, such as a wire made by Bekaert of Belgium.

Element types can also include electrical strands, such as an individual strand of copper wire having an outer diameter of 1 millimeter, bundles of 2 to 20 individual strands having a diameter of 0.0147 inches, fiber optic strands, such as those made by Dow Corning, woven aluminum wire, or a pressure armor, which is used within an interior of a flexible riser used in a subsea oil well, such as those made by Wellstream, Technip, or NKT of Denmark. Element types can further include one or more polymeric strands, such as polypropylene, polyethylene, or polyaramide strands.

Element types can also include shaped fillers, which can include round fillers or fillers having other shapes used to fill gaps between elements in a bundle to provide a rounder cross-sectional shape to the bundle.

The term "bundle" refers to a group of element types. A bundle can have specification information independent of the specification information of the individual element types contained within the bundle. One or more items of specification information for the bundle can be determined using the specification information of the individual element types within the bundle. One or more items of specification information for the bundle could also be determined independent of the specification information of the individual element types. For example, the mass of a bundle could be determined using the individual masses of each individual element type within the bundle, while the pitch angle of the bundle could be a default value obtained from the library of specification information.

The library of specification information can include element dimensions, such as lengths and diameters, or element properties, which can include mechanical properties such as mass, elasticity, yield strength, magnetic properties, heat transfer properties, conductivity, or permeability. The library of specification information can further include element material properties, such as insulation, element electrical properties, such as a dielectric constant, bundle dimensions, bundle properties, bundle electrical properties, and combinations thereof.

Dimensions and properties can include inner diameter, outer diameter, wall thickness, material density, a name or description of an element or bundle, a modulus of elasticity, an element or bundle mass per unit length, a material ultimate tensile strength, a material yield strength, content of a tube, pressure and temperature specifications including melting points, conductivity, lay length, lay angle, and other similar dimensions and properties.

The present method also includes creating a library of drawing characteristics related to each of the plurality of element types and each of the plurality of bundles. Drawing characteristics can include shading, such as to indicate thickness, cross hatching, such as to indicate metal or another material, color, such as black to indicate the wall of a tube and yellow to indicate a sheath surrounding the tube, and orientation, which can include the position of an element type and the direction in which an element type faces.

The library of drawing characteristics can be coded as a table within the software tool useable to perform the present method. It is also contemplated that the library of drawing characteristics could be part of a separate application, list, database, array, or other compilation of information.

It is contemplated that selected element types are originally assigned default drawing characteristics from the library of drawing characteristics and default specification information from the library of specification. However, a user can input modified drawing characteristics and/or modified specification information, which can be stored in association with the element type, enabling the element type with modified specification information and/or drawing characteristics to be retrieved for future use.

An element type is then selected from an element type menu, forming a selected element type, such as by using a mouse, keyboard, or other input device. The element type menu can include a drop-down menu, a tool-strip menu, or a similar type of menu that lists sorted or unsorted element types and other functions of the software tool used to perform the present method.

The element type is positioned at an element insertion point. The term "element insertion point" refers to a position indentified by a user on a drawing page of the software tool and the registration of the element type, such as by right clicking the software with a mouse. An element insertion point can be any location on a display device within a drawing area provided by the software.

The present method then includes calculating an identification key for the selected element type, forming a graphics object. An identification key is created for every element type selected, and no two identification keys are the same. The identification keys are used to track each selected element type and resulting graphics object. Each identification key is preferably an integer, such as 10010, but it is contemplated that identification keys could also include alphanumeric keys, alphabetic keys, symbol-based identifiers, and other similar identifiers.

The calculation of the identification key can include a simple and efficient calculation, such as determining the value of the largest existing identification key that is an integer, adding one to the integer to obtain a new identification key, and assigning the new identification key to the element type. It is contemplated that, in an embodiment, the calculation of the identification key can include use of random number or alphanumeric generators.

Once an element type has been associated with an identification key, it is contemplated that the selected element type and any related specification information and/or drawing characteristics can be stored in association with the identification key and retrieved for future use. This feature enables the present method to allow previously selected element types and bundles to be used numerous times, in the design of any future conduit, without recreating the objects, thereby saving time and labor.

The resulting graphics object for the selected element type is contemplated to be a cross-sectional depiction of the selected element type. For example, a selected metal tube with a wall thickness of 0.5 inches and an inner diameter of 0.75 inches, having a thin polymer sleeve, could be depicted as a black circle with a thick border, encircled by a yellow circle with a thin border.

A selected flat armor wire could be depicted as a colored rectangle having a length and width proportional to the dimensions of the represented flat armor wire. A selected shaped filler could be depicted as a shape approximating the shape of the selected shaped filler, having cross hatching representing the material of the shaped filler.

The present method includes repeating the selecting of element types and the calculating of identification keys for each selected element type, forming an updated graphics object with each repetition. The updated graphics object can depict any number of selected element types, each located at the respective element insertion point at which the selected element types were positioned.

Specification information for each selected element type is retrieved from the library of specification information, forming retrieved specification information. The retrieved specification information is then stored in association with the selected element types using each element type's respective identification key.

In an embodiment, the retrieved specification information can be replaced with other specification information, such as specification information provided by user entry, by a software program, or combinations thereof. It is contemplated that a user can modify one or more parametrics of the element type to form a modified element. The replacement specification information can then be stored in association with the modified element.

New parametrics can simultaneously and automatically be calculated for one or more element types, bundles, or combinations thereof, such as by use of a software program. Parametrics of all element types, bundles, or combinations thereof that are connected to the modified element, bundle, or combinations thereof can be simultaneously and automatically modified to account for the new parametrics.

The drawing characteristics for each selected element type are retrieved from the library of drawing characteristics, forming retrieved drawing characteristics, and stored in association with the selected element types. It is contemplated that in an embodiment, the drawing characteristics can be replaced with other drawing characteristics, such as drawing characteristics provided by user entry, a software program, or combinations thereof. The replacement drawing characteristics can then be stored in association with the selected element type using the element type's identification key.

For example, a user may select a metal pipe for transporting methanol from the element type menu. Specification information would be retrieved from the library of specification information, indicating an inner diameter of 0.5 inches, a wall thickness of 0.25 inches for the metal pipe, and other, similar information relating to lay length, pitch angle, and other specifications. Likewise, drawing characteristics would be retrieved, and a black circle approximately 0.5 inches in diameter with a thick border would be displayed.

A user could manually enter a larger inner diameter, such as 1 inch, and this replacement specification information would be stored in association with the selected metal pipe. The graphics object representing the pipe could be automatically updated to depict a circle having a larger diameter. The user could also manually change the thick border to a border having cross hatching for indicating metal, and this drawing characteristic would be stored in association with the selected metal pipe.

In an embodiment, the specification information and drawing characteristics for one or more selected element types can be retrieved and/or stored simultaneously.

The present method then includes selecting at least two element types of the updated graphics object and forming a bundle. For example, three graphic representations of electrical wires could be selected to be formed into a bundle using the software tool used to perform the present method.

The bundle is positioned at a bundle insertion point, which can be any selected point within the drawing page of the software tool indicated by the registration of the bundle, such as by right clicking the software tool with a mouse.

An identification bundle key is calculated for the bundle. The identification bundle key can be calculated in the same manner as the identification key relating to one or more element types, such as by adding one to the largest existing identification key for either an element type or a bundle.

Specification information and drawing characteristics for the bundle can be simultaneously retrieved from the library of specification information and the library of drawing characteristics, respectively, to form a bundle graphics object.

In an embodiment, the specification information, drawing characteristics, or combinations thereof can be modified, such as by user entry or a software program. The modified specification information, drawing characteristics, or combinations thereof can then be stored in association with the bundle using the bundle identification key.

A bundle graphics object is contemplated to depict each individual element type contained within the bundle, in close proximity, with a first circle touching the edge of at least one of the depicted element types, indicating a possible outer diameter of the bundle, and a second circle between each of the element types, indicating a possible inner diameter of the bundle.

The selecting of element types from the updated graphics object is repeated, forming additional bundles, for which additional identification bundle keys are calculated. An updated bundle graphics object is formed after each repetition. The updated bundle graphics object can include depictions of multiple bundles that are formed, or modified depictions of existing bundle graphics objects, such as when one or more elements are selected to be added to or removed from existing bundle graphics objects.

It is contemplated that a user can modify one or more parametrics of the bundle. New parametrics can simultaneously and automatically be calculated for the bundles, such as by use of a software program. Parametrics of all element types, bundles, super bundles, larger aggregations, or combinations thereof that are connected to the modified bundle can be simultaneously and automatically modified to account for the new parametrics.

In an embodiment, the present method can include the formation of recursive aggregations of multiple bundles, aggregations of these aggregations, and further aggregations, as needed, to design conduits containing large numbers of aggregated bundles and groups of bundles.

Two or more updated bundle graphics objects can be selected to form a super bundle, which can be positioned at a super bundle insertion point.

An identification super bundle key can be calculated for each super bundle. The identification super bundle key can be calculated in the same manner as identification keys for element types and/or bundles.

Specification information and drawing characteristics for the super bundle are simultaneously retrieved from the library of specification information and the library of drawing characteristics, respectively, forming a super bundle graphics object. In an embodiment, this information can be replaced with other specification information and drawing characteristics entered by a user or provided by a software program.

Selection of two or more updated bundle graphics objects and calculation of identification super bundle keys can be repeated, forming an updated super bundle graphics object with each repetition.

The retrieved specification information and drawing characteristics can then be stored in association with the updated super bundle graphics object.

The aggregation of bundles, super bundles, or combinations thereof can be repeated to form further aggregations. Aggregations of these further aggregations can also be formed as graphics objects.

Graphics objects can be formed representing aggregations of at least two members of the group consisting of: an element type, a bundle, a super bundle, other aggregations, and combinations thereof.

In an embodiment, it is contemplated that elements, bundles, super bundles, and other aggregations can be removed from graphics objects and updated graphics objects. For example, a user could select a graphics object representing an element type and delete the graphics object. A user could also remove one or more selected element types from a bundle, one or more bundles from a super bundle, or delete entire bundles or super bundles.

In a contemplated embodiment, the present method can include the step of adding element types to the element type menu. For example, a new type of flexible tubing for use in conduits not included in the element type menu can be added. Specification information and drawing characteristics relating to the new element type can also be added to the library of specification information and the library of drawing characteristics, respectively.

It is contemplated that, in an embodiment, specification information can be added or removed from the library of specification information, and that drawing characteristics can be added or removed from the library of drawing characteristics.

In an embodiment, the present method can also include creating a library of costs relating to each of the plurality of element types. Part cost information, raw material cost information, manufacturing cost information, or combinations thereof can be retrieved from the library of costs, simultaneous with the retrieval of specification information and/or drawing characteristics from the respective libraries.

It is also contemplated that information can be added or removed from the library of costs. Through use of the library of costs, the present method can enable accurate quantities of required parts and/or materials and related costs to be calculated nearly instantaneously, simultaneous with the conduit design process.

The present method can further include the step of printing one or more graphics objects, printing a calculation report, printing a material selection report, saving one or more graphics objects, connecting to another software program, or combinations thereof, once a graphics object is formed.

Use of the present method is illustrated through the following example:

A user that wishes to design a conduit for carrying electrical cable can provide specifications for an umbilical to be produced. For example, the user may specify that the umbilical must contain 2 electrical quads, 8 metal tubes with a diameter of 0.5 inches, and 1 metal tube with a diameter of 1.0 inch. The user can also specify desired pressure ratings for the metal tubes and voltage and power ratings for the electrical quads.

Using international standards and/or codes, the appropriate wall thickness for the metal tubes required to meet the user's specifications can be determined. The copper cross-section area and insulation thickness required to meet the user's specifications for the electrical quads can also be determined using international standards and/or codes.

Pre-coded libraries of specification information and drawing characteristics containing programmed default values for metal tubes and electrical quads are provided for access. The libraries can be stored on a networked server or a similar data storage media for access during the design of the umbilical.

Using a software tool, the user can select a metal tube from the element type menu, which can be a drop down menu, a tool-strip menu, or a similar type of menu. A graphics object depicting the metal tube will appear alongside a window displaying default specifications for the metal tube obtained from the library of specification information. The default diameter of the tube can be 0.5 inches, with a corresponding wall thickness.

The user can modify the diameter of the metal tube to 1.0 inch and double the default wall thickness by entering data into the window displaying specification information, which will automatically cause the displayed graphics object to reference new drawing characteristics from the library of drawing characteristics. The initial graphics object will be replaced by a new graphics object representing the metal tube having a diameter of 1.0 inch.

The user can position the graphics object anywhere within the drawing window of the display, thereby selecting an element insertion point.

A identification key, such as 43567, relating to the 1.0-inch diameter metal tube is calculated by the software tool, which checks all existing identification keys and generates an identification key that is not yet used by adding one to the largest existing identification key. This identification key is then associated with the 1.0-inch diameter metal tube.

The user can then select eight additional metal tubes from the element type menu, adjusting the specification information as needed. The user can also select two previously generated electrical quads inserted from a previous file, also adjusting the specification information for each electrical quad, if necessary. Each new element type can be inserted at any desired element insertion point.

The user can then select each of the metal tubes and both electrical quads, such as by clicking on each element with a mouse, then form a bundle, such as by right-clicking the software window and selecting that a bundle be formed using a menu.

A graphics image representing a bundle containing the 8 0.5-inch diameter metal tubes, the 1 1.0-inch metal tube, and the 2 electrical quads will appear alongside a window displaying specification information for the bundle, such as the lay angle and lay length of the bundle. Some elements of this specification information can be determined by the software using the specification information for each individual element type within the bundle. Other elements of the specification information for the bundle can be default settings retrieved from the library of specification information. Items of specification information for the bundle can be changed by a user, such as by entering a new lay angle, and all other items of specification information can be automatically updated by the software to account for the change input by the user.

The processor is then instructed to create an identification bundle key for the bundle, which can be obtained by adding one to the largest existing identification key, yielding the identification bundle key 45368. The identification bundle key is then stored in association with the bundle.

The graphics object representing the bundle can be inserted at any desired insertion point.

A user can add any number of element types and form any number of bundles, as needed to design the desired conduit. Further, multiple bundles can be selected and formed into super bundles. Multiple super bundles can be selected and formed into larger aggregations, which can in turn be formed into even larger aggregations. An unlimited number of aggregations can be formed, as necessary, to design a conduit.

Referring now to FIG. 1, a diagram of an embodiment of a system useable with the present method is shown.

FIG. 1 depicts data storage (5), which can be any type of data storage medium or combination of data storage media, including fixed data storage, such as a computer hard drive, removable data storage, such as a portable memory stick, networked data storage, such as a server, and other types of data storage media.

Data storage (5) is shown in communication with a processor (6), which can be any type of processor, such as an Intel™ or AMD™ processor. The processor (6) could also be a processor within a cellular telephone, personal digital assistant, or similar handheld device.

The processor (6) is depicted in communication with a display (7), which can be any type of display device, including a computer monitor, a projection screen, a display of a cellular telephone, personal digital assistant, or similar handheld device, or other similar displays.

A user (9) is depicted in communication with the processor (6), using an input device (13), which can include one or more keyboards, keypads, touch screens, a mouse, voice recognition software, and/or other types of input devices. The user (9) is contemplated to provide input to the processor (6) in response to the output transmitted from the processor (6) to the display (7).

The display (7) is depicted displaying an element type menu (20), containing a first element type (18a), a second element type (18b), and a third element type (18c), for selection by the user (9). For example, the first element type (18a) could be a metal pipe, the second element type (18b) could be an electrical wire, and the third element type (18c), could be a polymeric tube.

Data storage (5) is shown containing a library of specification information relating to a plurality of element types (10). The library of specification information relating to a plurality of element types (10) contains a first element type specification information (30a), a second element type specification information (30b), and a third element type specification information (30c).

It is contemplated that the first element type specification information (30a) relates to the first element type (18a), the second element type specification information (30b) relates to the second element type (18b), and the third element type specification information (30c) relates to the third element type (18c). For example, the first element type (18a) could have first element type specification information (30a) that indicates a default outer diameter of 0.5 inches, a wall thickness of 0.25 inches, a lay angle of 12 degrees, and a lay length of 634.995 millimeters.

Data storage (5) is also shown containing a library of drawing characteristics relating to a plurality of element types (12). The library of drawing characteristics relating to a plurality of element types (12) contains a first element type drawing characteristic (32a), a second element type drawing characteristic (32b), and a third element type drawing characteristic (32c).

It is contemplated that the first element type drawing characteristic (32a) relates to the first element type (18a), the second element type drawing characteristic (32b) relates to the second element type (18b), and the third element type drawing characteristic (32c) relates to the third element type (18c). For example, the first element type (18a) could have first element type drawing characteristic (32a) that indicates a default drawing that includes a black circle having a diameter of 0.5 inches and a line width of 0.1 inches.

Data storage (5) is further shown containing a library of specification information related to a plurality of bundles (14), which includes a first bundle specification information (40a), a second bundle specification information (40b), and a third bundle specification information (40c). The bundle specification information (40a-c) is contemplated to relate to one or more bundles that can be formed from element types.

Data storage (5) also contains a library of drawing characteristics related to a plurality of bundles (16). The library of drawing characteristics related to a plurality of bundles (16), includes a first bundle drawing characteristic (42a), a second bundle drawing characteristic (42b), and a third bundle drawing characteristic (42c). The bundle drawing characteristics (42a-c) are contemplated to relate to one or more bundles formed from element types.

Data storage (5) is further shown containing computer instructions (11), which are contemplated to instruct the processor (6) to accept user input to replace specification information and drawing characteristics associated with an element type or bundle, to produce graphics objects representing element types and bundles, to calculate identification keys, and to store identification keys associated with element types and/or bundles and related specification information and drawing characteristics. The computer instructions (11) can also calculate specification information responsive to the formation of bundles or the replacement of specification information by a user.

Figure 2:
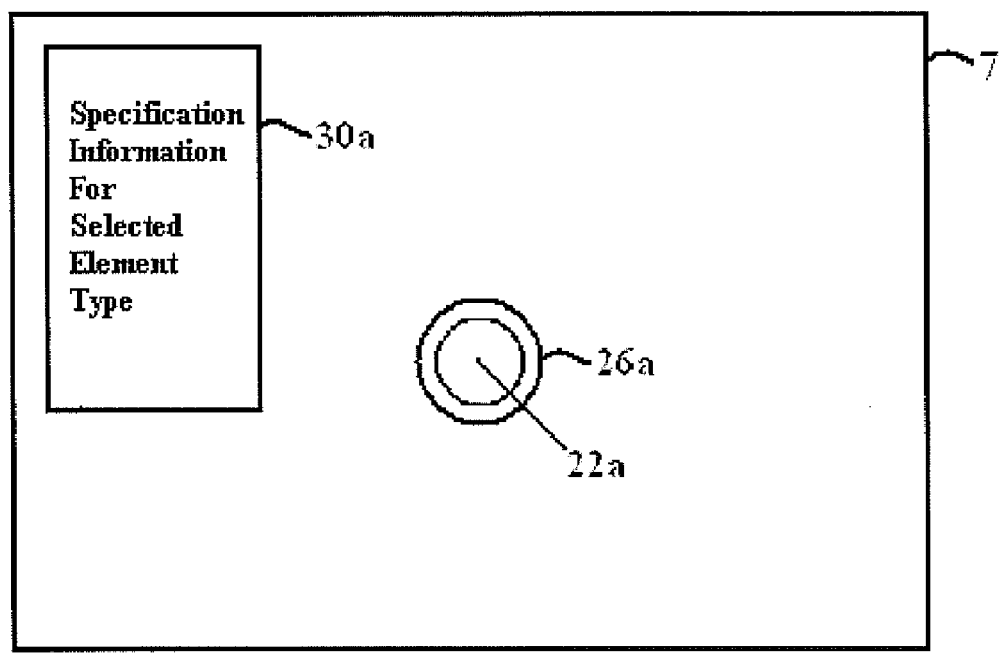
FIG. 2 depicts a display showing a graphics object produced using the present method.

Referring now to FIG. 2, a display (7) is shown depicting an exemplary display screen produced using the present method.

It is contemplated that after a user selects an element type (18a, depicted in FIG. 1) from the element type menu, the computer instructions in the data storage can instruct the processor to generate a first graphics object (26a) using the first element type drawing characteristics (32a, depicted in FIG. 1).

The first graphics object (26a) is shown as an inner circle, representing a metal pipe, encircled by an outer circle, representing a protective sleeve for the metal pipe.

The display (7) also displays the first element type specification information (30a) related to the selected element type.

It is contemplated that the user can enter replacement specification information to replace the displayed specification information (30a). Entered replacement specification can cause the computer instructions to modify the first graphics object (26a). For example, if the user were to change the inner diameter of the specification information (30a) from 0.5 inches to 1.0 inch, the first graphics object (26a) could be automatically modified by the processor to appear larger.

It is further contemplated that the user can alter the drawing characteristics of the first graphics object (26a), such as by changing the color or thickness of the lines, adding or removing cross hatching, or changing other similar characteristics.

The first graphics object (26a) is positioned at a first element type insertion point (22a). It is contemplated that a user can move the first graphics object (26a) to any other position within the display (7).

Figure 3:
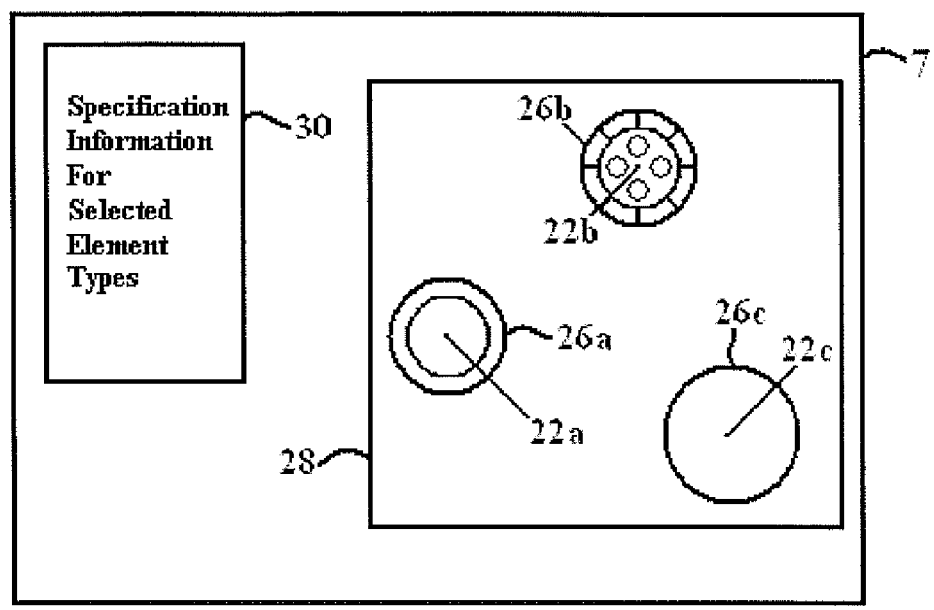
FIG. 3 depicts a display showing multiple graphics objects produced using the present method.

Referring now to FIG. 3, an exemplary display (7) is depicted after a user has selected additional element types from the element type menu. The display (7) depicts an updated graphics object (28), which is formed after each additional element type is selected by a user. The updated graphics object (28) includes the individual graphics objects for each selected element type.

The display (7) depicts the first graphics object (26a) at the first element type insertion point (22a), representing the first element type (18a, depicted in FIG. 1).

A second graphics object (26b) is depicted at a second element type insertion point (22b), representing the second element type (18b, depicted in FIG. 1). It is contemplated that the processor can produce the second graphics object using the drawing characteristics relating to the second element type. The second graphics object (26b) is depicted as a circle having four round internal components, representing an electrical quad.

A third graphics object (26c) is depicted at a third element type insertion point (22c), representing the third element type (18c, depicted in FIG. 1). It is contemplated that the processor can produce the third graphics object using the drawing characteristics relating to the third element type. The third graphics object is depicted as a circle representing a flexible tube for carrying fluid.

The specification information (30) relating to any of the first element type, the second element type, the third element type, or combinations thereof, can be displayed on the display (7) simultaneous with the graphics objects (26a-c).

It is contemplated that a user can modify the specification information (30) or drawing characteristics for any of the graphics objects (26a-c).

Figure 4:
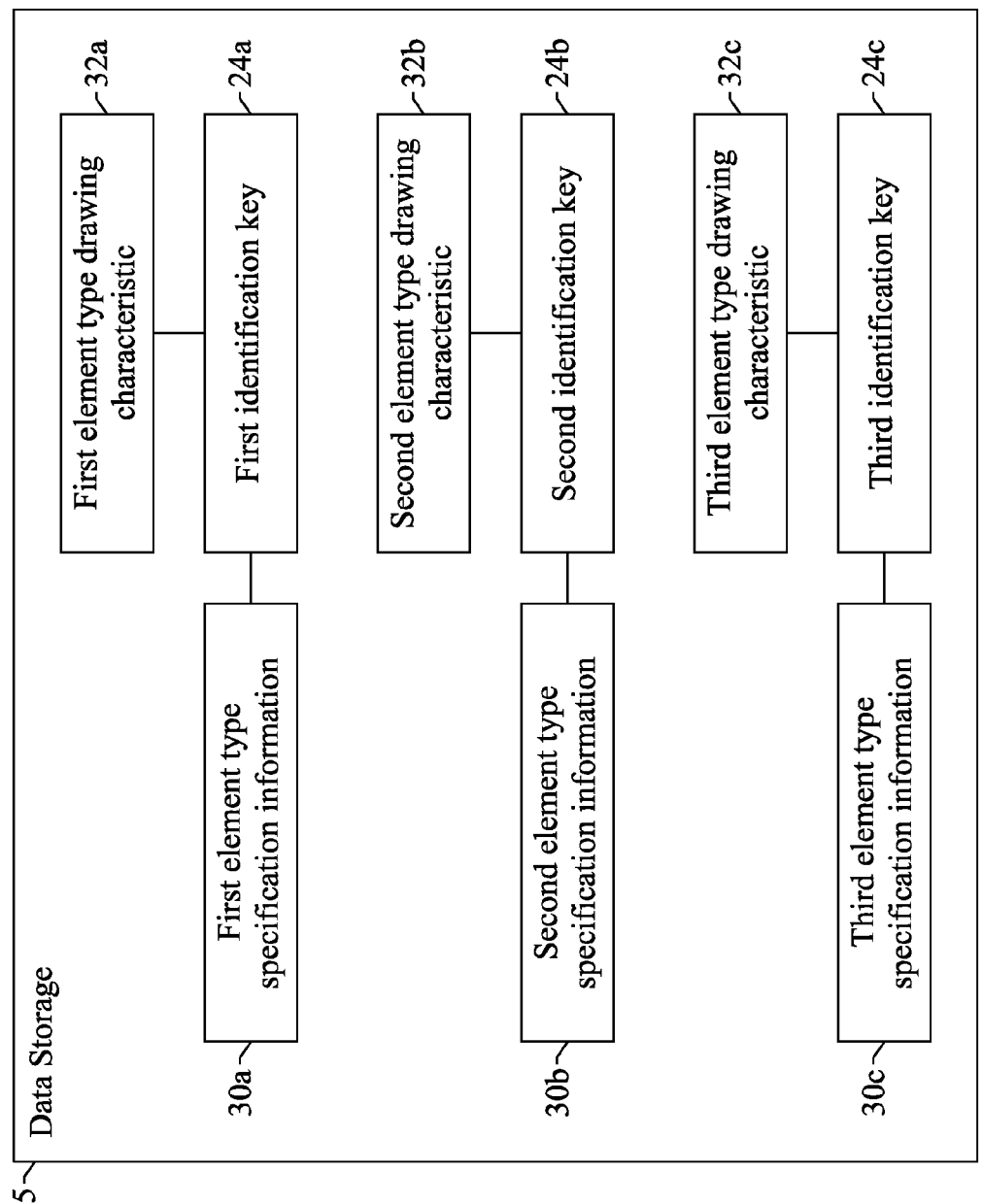
FIG. 4 depicts a diagram of an embodiment of stored data useable with the present method.

Referring now to FIG. 4, a diagram depicting exemplary contents of the data storage (5) is shown.

After forming a graphics object for each selected element type, it is contemplated that the processor (depicted in FIG. 1) can be instructed to calculate an identification key for each selected element type. Each identification key is stored in the data storage (5) in association with the specification information and drawing characteristics for the element type.

It is contemplated that the identification keys allow individual element types to be tracked and referenced. For example, if a user selects an element type, then replaces the specification information related to that element type with other specification information, the identification key generated for the element type using the present method can store the modified specification information for that element type in association with the identification key.

A first identification key (24a) is depicted stored in data storage (5) in association with the first element type specification information (30a) and first element type drawing characteristics (32a) that relate to the first element type (18a, depicted in FIG. 1). It is contemplated that the first element type specification information (30a), the first element type drawing characteristics (32a), or combinations thereof can include data retrieved from the library of specification information or the library of drawing characteristics, respectively, or data inserted by a user.

A second identification key (24b) is depicted stored in data storage (5) in association with the second element type specification information (30b) and second element type drawing characteristics (32b) that relate to the second element type (18b, depicted in FIG. 1). It is contemplated that the second element type specification information (30b), the second element type drawing characteristics (32b), or combinations thereof can include data retrieved from the library of specification information or the library of drawing characteristics, respectively, or data inserted by a user.

A third identification key (24c) is depicted stored in data storage (5) in association with the third element type specification information (30c) and third element type drawing characteristics (32c) that relate to the third element type (18c, depicted in FIG. 1). It is contemplated that the third element type specification information (30c), the third element type drawing characteristics (32c), or combinations thereof can include data retrieved from the library of specification information or the library of drawing characteristics, respectively, or data inserted by a user.

Each identification key could also be stored with the associated graphics object, element type, and other similar information relating to the associated element type.

Figure 5:
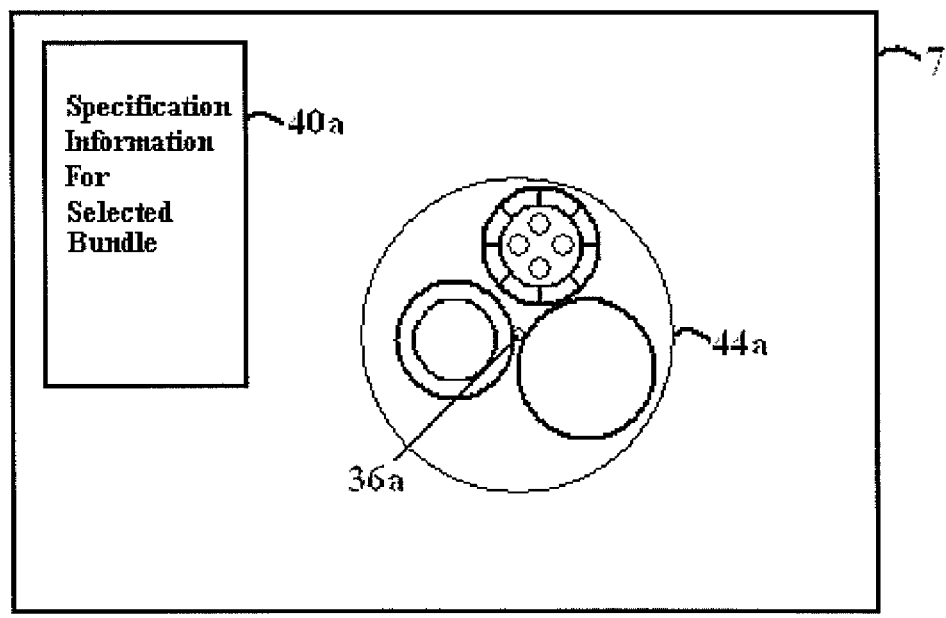
FIG. 5 depicts a display showing a bundle graphics object produced using the present method.

Referring now to FIG. 5, an exemplary display (7) is depicted after a user has selected displayed graphics objects for three element types and formed a bundle.

It is contemplated that after a user selects two or more graphics objects representing element types, computer instructions in the data storage can instruct the processor to aggregate the selected element types into a bundle and display a bundle graphics object.

The display (7) depicts a first bundle graphics object (44a) at a first bundle insertion point (36a). The first bundle graphics object (44a) can be positioned at any location in the display (7) by the user.

The first bundle graphics object (44a) is shown as an outer circle, touching the edge of one of the individual graphics objects for an element type, indicating a possible outer diameter of the bundle. The first bundle graphics object (44a) also includes an inner circle between each of the graphics objects representing element types, indicating a possible inner diameter of the bundle.

The drawing characteristics of the first bundle graphics object (44a) can be determined using the first bundle drawing characteristics (42a) from the library of drawing characteristics related to bundles (16, depicted in FIG. 1).

The display (7) also displays first bundle specification information (40a) relating to the bundle. The first bundle specification information (40a) can be derived from the specification information relating to each of the individual selected element types within the bundle, from the library of specification information related to bundles (14, depicted in FIG. 1), or combinations thereof.

It is contemplated that the user can enter replacement specification information to replace the displayed specification information (40a). Entered replacement specification can cause the computer instructions to modify other specification information and/or the first bundle graphics object (44a). For example, if the user were to change the pitch angle of the specification information (40a), the processor could calculate a new lay length, mass, and weight for the bundle, as well as other specification information, and automatically display the new lay length, mass, weight, and other information in the specification information (40a).

It is further contemplated that the user can alter the drawing characteristics of the first bundle graphics object (44a), such as by changing the color or thickness of the lines, adding or removing cross hatching, or changing other similar characteristics.

Figure 6:
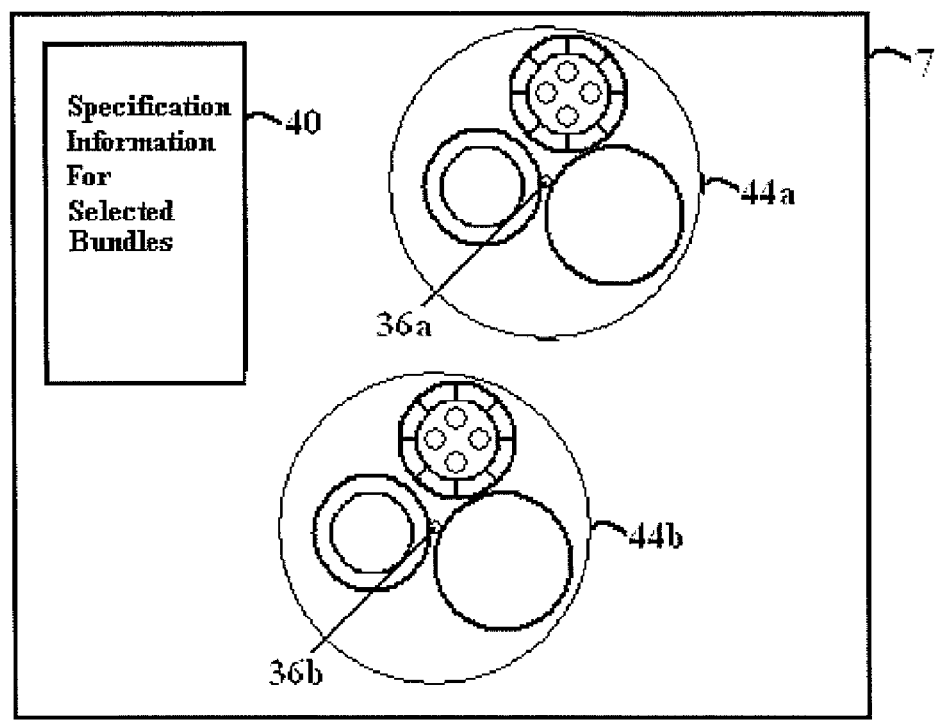
FIG. 6 depicts a display showing multiple bundle graphics objects produced using the present method.

Referring now to FIG. 6, an exemplary display (7) is depicted after a user has selected additional element types from the element type menu, selected the graphics objects representing the additional element types, and formed a second bundle from the additional element types.

The display depicts the first bundle graphics object (44a) at the first bundle insertion point (36a).

A second bundle graphics object (44b) is depicted at a second bundle insertion point (36b). The second bundle graphics object (44b) can be produced using the second bundle drawing characteristics (42b) from the library of drawing characteristics relating to bundles (16, depicted in FIG. 1).

The second bundle graphics object (44b) is depicted as an identical bundle, containing identical element types to the bundle represented by the first bundle graphics object (44a), however, it is contemplated that any types of bundles containing identical or different element types can be displayed and represented with bundle graphics objects.

The display (7) can also depict bundle specification information (40) relating to one or both of the displayed bundles. It is contemplated that the user can replace any items of the specification information (40), and/or any drawing characteristics of the first bundle graphics object (44a) or the second bundle graphics object (44b), or combinations thereof.

Figure 7:
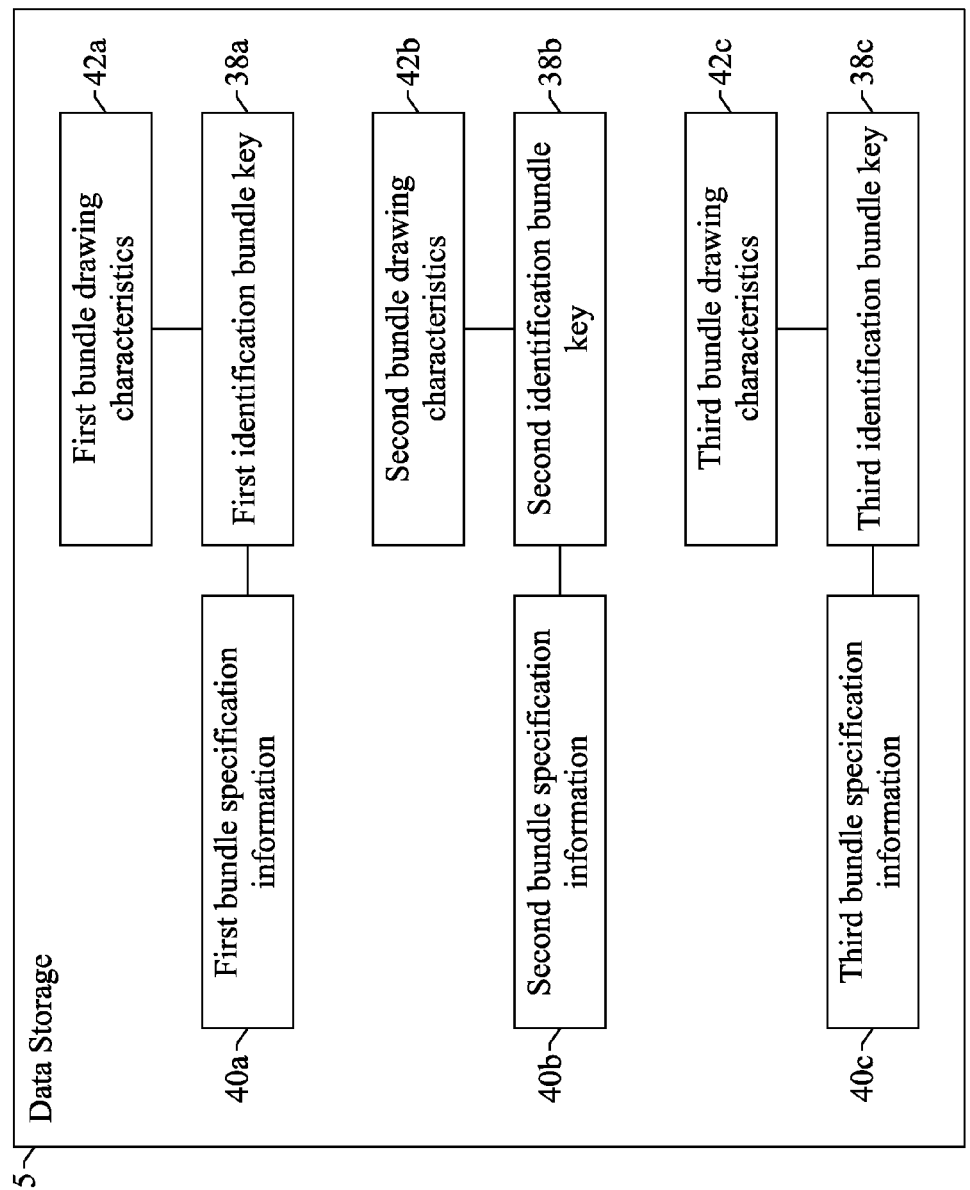
FIG. 7 depicts a diagram of an embodiment of stored data relating to bundles useable with the present method.

Referring now to FIG. 7, a diagram depicting exemplary contents of the data storage (5) is shown.

After forming one or more bundles of element types, it is contemplated that the processor (depicted in FIG. 1) can be instructed to calculate an identification bundle key for each bundle. Each identification bundle key is stored in the data storage (5) in association with the specification information and drawing characteristics for the bundle.

It is contemplated that the identification bundle keys allow individual bundles to be tracked and referenced in the same manner as individual element types. For example, if a user selects a bundle, then replaces the specification information related to that bundle with other specification information, the identification bundle key generated for the bundle using the present method can store the modified specification information for that bundle in association with the identification bundle key.

A first identification bundle key (38a) is depicted stored in data storage (5) in association with the first bundle specification information (40a) and first bundle drawing characteristics (42a) that relate to the first bundle represented by bundle graphics object (44a, depicted in FIG. 6). It is contemplated that the first bundle specification information (40a), the first bundle drawing characteristics (32a), or combinations thereof can include data retrieved from the library of specification information or the library of drawing characteristics, respectively, or data inserted by a user.

A second identification bundle key (38b) is depicted stored in data storage (5) in association with the second bundle specification information (40b) and second bundle drawing characteristics (42b) that relate to the second bundle represented by bundle graphics object (44b, depicted in FIG. 6). It is contemplated that the second bundle specification information (40b), the second bundle drawing characteristics (32b), or combinations thereof can include data retrieved from the library of specification information or the library of drawing characteristics, respectively, or data inserted by a user.

A third identification bundle key (38c) is depicted stored in data storage (5) in association with the third bundle specification information (40c) and third bundle drawing characteristics (42c) that can relate to an additional third bundle formed by a user. It is contemplated that the third bundle specification information (40c), the third bundle drawing characteristics (32c), or combinations thereof can include data retrieved from the library of specification information or the library of drawing characteristics, respectively, or data inserted by a user.

Each identification bundle key could also be stored with the associated bundle graphics object and other similar information relating to the associated bundle.

While these embodiments have been described with emphasis on the embodiments, it should be understood that within the scope of the appended claims, the embodiments might be practiced other than as specifically described herein.

What is claimed is:

1. A method for computer aided design of conduit comprising:
   a. selecting a first element type from an element type menu, wherein the first element type is linked with a specification stored in a database of specification information and a drawing characteristic stored in a database of drawing characteristics on a data storage in communication with a processor, and wherein the specification and drawing characteristic are displayed on a display screen;
   b. generating a first graphic object depicting the first element type on the display screen at a point of input, wherein the first graphic object is automatically generated using the specification and the drawing characteristic linked to the first element type;
   c. selecting a second element type from the element type menu, wherein the second element type is linked with a specification stored in the database of specification information and a drawing characteristic stored in the database of drawing characteristics on the data storage in communication with the processor, and wherein the specification and drawing characteristic are displayed on the display screen;
   d. generating a second graphic object depicting the second element type on the display screen at a point of input, wherein the second graphic object is automatically generated using the specification and the drawing characteristic linked to the second element type;
   e. selecting the first graphic object and the second graphic object and selecting a function from a menu to form a bundled graphic object, wherein the bundled graphic object is formed using computer instructions in the data storage to instruct the processor to aggregate the first element type and the second element type into the bundled graphic object; and
   f. instantaneously with the aggregating performing calculations using software that performs calculations using the specification information linked to each of the graphic objects that account for three dimensions, showing all angles, vectors, and parts of a conduit and using the calculations to automatically generate a list of components, raw materials, and manufacturing costs as the bundled graphic object is formed.

2. The method of claim 1, further comprising changing the specification linked to the element type, and wherein the graphic object is automatically modified based on the changed specification.

3. The method of claim 1, further comprising changing the specification linked to the element type and automatically modifying the graphic object based on the changed specification, wherein an identification key is assigned to the changed specification and stored on the data storage.

4. The method of claim 1, further comprising selecting an additional element type from the element type menu, wherein the additional element type is linked to an additional specification stored in the database of specification information and an additional drawing characteristic stored in the database of drawing characteristics on the data storage in communication with the processor, wherein the additional specification and additional drawing characteristic are displayed on the display screen.

5. The method of claim 1, wherein a bundle identification key is associated with the bundled graphic object.

6. The method of claim 1, further comprising linking a plurality of specifications to the element type stored in the database of specification information.

7. The method of claim 6, wherein the plurality of specifications linked to the element type comprises element type dimensions, element type properties, element type material properties, and element type electrical properties.

8. The method of claim 1, wherein the specification comprises at least one of: element type dimensions, element type properties, element type material properties, and element type electrical properties.

9. The method of claim 1, further comprising linking a plurality of drawing characteristics linked to the element type stored in the database of drawing characteristics.

10. The method of claim 9, wherein the plurality of drawing characteristics linked to the element type comprises shading, cross hatching, color, and orientation.

11. The method of claim 1, further comprising modifying at least one of the specification or the drawing characteristic linked to the element type and calculating a cost associated with the element type in response to the modification.

12. The method of claim 1, wherein the element type comprises a tube, a sheath, a tape, a wire, a fiber optic strand, an armor, a filler, or combinations thereof.

13. The method of claim 1, wherein the bundling of the first graphic object and the second graphic object comprises disposing the first graphic object and the second graphic object within a sheath.

14. The method of claim 1, wherein the display of the bundled graphic object comprises a first circle touching an edge of the first graphic object or the second graphic object indicating an outer diameter of the bundled graphic object, and a second circle disposed between the first graphic object and the second graphic object indicating an inner diameter of the bundled graphic object.

15. The method of claim 1, wherein the first graphic object is displayed as an inner circle and wherein the second graphics object is displayed as an outer circle encircling the inner circle, thereby representing a sleeve disposed over a pipe.

16. The method of claim 1, wherein the display of the bundled graphic object comprises:
   a. an outer circle touching an edge of the first graphic object indicating an outer diameter of the bundled graphic object; and
   b. an inner circle disposed between the first graphic object and the second graphic object, indicating an inner diameter of the bundled graphic object.

17. The method of claim 1, further comprising a shaped filler filling gaps between the first graphic object and the second graphic object of the bundled graphic object to provide a round cross-sectional shape to the bundled graphic object.

18. The method of claim 1, wherein the element type is a member of the group consisting of: a metal tube, an electrical quad, an extruded polymer sheath, or combinations thereof.

* * * * *